Feb. 3, 1953     G. E. BOCK ET AL     2,627,109
WORKSTAND Filed Aug. 31, 1948     5 Sheets-Sheet 1

Inventor
George E. Bock
Erie Roberts
Evert C. Hokanson
By: Fred Gerlach atty.

Feb. 3, 1953 G. E. BOCK ET AL 2,627,109
WORKSTAND
Filed Aug. 31, 1948 5 Sheets-Sheet 2

Inventors
George E. Bock
Erie Roberts.
Evert C. Hokanson
By: Fred Gerlach Atty.

Feb. 3, 1953 G. E. BOCK ET AL 2,627,109
WORKSTAND
Filed Aug. 31, 1948 5 Sheets-Sheet 3

Patented Feb. 3, 1953

2,627,109

UNITED STATES PATENT OFFICE 2,627,109

WORKSTAND

George E. Beck, Chicago, and Erie Roberts, Harvey, Ill., and Evert C. Hokanson, Bell, Calif., assignors to Whiting Corporation, Harvey, Ill., a corporation of Illinois Application August 31, 1948, Serial No. 47,036

4 Claims. (Cl. 29—289)

The present invention relates generally to workstands. More particularly the invention relates to that type of workstand which is designed primarily for use in a repair, assembly or fabricating establishment and serves to support in different positions an object, such as a radial variety aircraft engine.

One object of the invention is to provide a workstand of this character which is an improvement upon, and has certain inherent advantages over, previously designed workstands and is characterised by the fact that it is essentially simple in design or construction and serves to support the object so that it is capable of being turned or rotated throughout 360° and also titled bodily throughout an arc of approximately 90° to the end that the object may be adjusted into substantially any particular angular position wherein it is readily accessible for working thereon.

Another object of the invention is to provide an adjustable workstand which as its principal component parts comprises a horizontally elongated base frame, an upstanding arcuate track on the base frame, a roller equipped carriage on the track, and a rotary holder member on the carriage.

Another object of the invention is the provision, in connection with an adjustable workstand of the last mentioned character, of gearing for moving the carriage in either direction along the arcuate track, and also gearing on the carriage for turning or rotating the rotary holder member throughout 360° with respect to the carriage.

Another object of the invention is to provide a workstand of the type and character under consideration in which the rotary holder member on the roller equipped carriage is tubular and is adapted when the workstand is utilized as an adjustable supporting medium for a radial variety aircraft engine to receive and support the exposed end of the engine crank shaft.

A further object of the invention is the provision, in connection with an adjustable workstand of the last mentioned character, of (1) a latch device which is mounted on the carriage, is adapted when a radial variety aircraft engine is supported or mounted on the workstand to be shifted into and out of a latched position wherein it is disposed between, and in interlocked relation with, two adjacent bolts of the usual annular series of bolts on the crank case of the engine, and serves when in its latched or operative position to hold the crank case and cylinders of the engine against turning relatively to the carriage while at the same time permitting the crank shaft of the engine to be turned in connection with rotation of the tubular rotary holder member on the carriage, and (2) a latch device which is movably mounted on the outer end of the rotary holder member, is adapted when the workstand is utilized as a supporting medium for a radial variety aircraft engine to be shifted into and out of a latched position wherein it is in interfitting relation with two of the bolts of the aforementioned usual annular series of bolts on the engine crank case and serves when in its latched position to lock the crank case to the holder member in order that turning or rotation of such member results in turning or rotation of the entire engine.

A still further object of the invention is to provide an adjustable workstand which is generally of new and improved construction, provides maximum angular adjustment of, and exceptional accessibility to, the object that is supported thereon, occupies but a compartively small space, and effectively and efficiently fulfills its intended purpose.

Other objects of the invention and the various advantages and characteristics of the present workstand will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals and letters of reference denote corresponding parts throughout the several views.

The workstand which is shown in the drawings constitutes the preferred form or embodiment of the invention. It serves as a medium or instrumentality for supporting any object in different positions in order that work may be performed on the object. Whereas the workstand has many capabilities of use one particular purpose is to support a radial variety aircraft engine either while it is being assembled or while the various auxiliary equipment, such as the carburetor, magneto, pumps and fuel and oil lines, are mounted thereon or dismantled in connection with repair thereof. The engine is illustrated in the drawings as being of standard or conventional construction and is designated by the reference letter E. It embodies a crank case $e$, an annular series of radially extending cylinders $e^1$ around the crank case and a crank shaft $e^2$ in the crank case. One end of the crank shaft projects through the crank case and has an annular series of longitudinally extending external splines $e^3$ whereby the crank shaft may be drivably connected to the hub of a propeller. The outer extremity of the exposed end of the crank shaft is provided with a male screw thread and this is adapted to have applied thereto a nut $e^4$ which, in conjunction with a pair of cone type washers serves removably to lock the propeller hub to the exposed end of the crank shaft. The crank case $e$ of the engine E is of sectional design and, as well understood in the art, embodies an annular series of equidistantly spaced bolts $e^5$ for securing certain of the sections thereof together. The bolts $e^5$ are disposed in parallel relation with the crank shaft and extend concentrically around the exposed end of the crank shaft. As its principal components or parts the workstand comprises a base frame 20, an upstanding arcuate track 21 on the base frame, a carriage 22 on the track, and a tubular rotary holder member 23 on the carriage.

Figure 2:
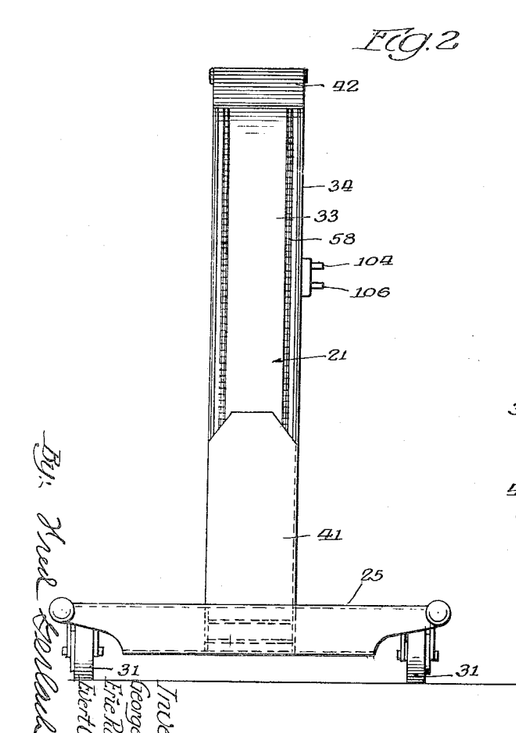
Figure 2 is a rear elevation of the workstand.
Figure 3:
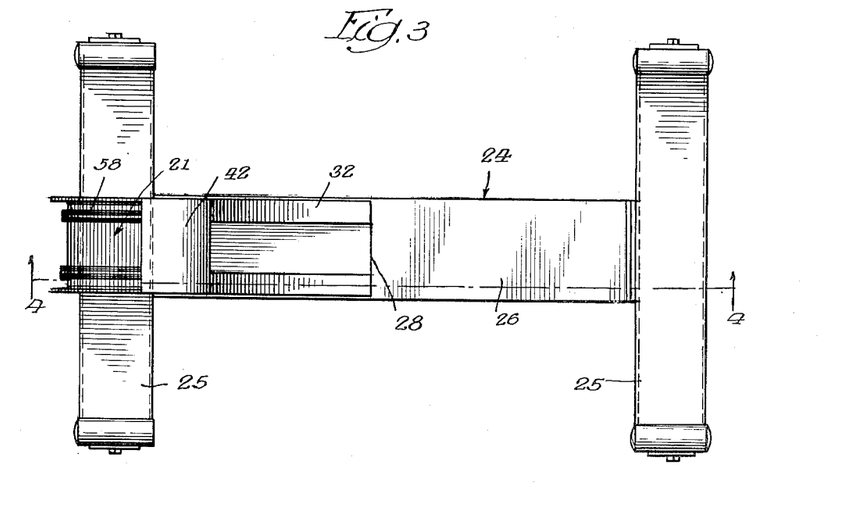
Figure 3 is a plan view.
Figure 4:
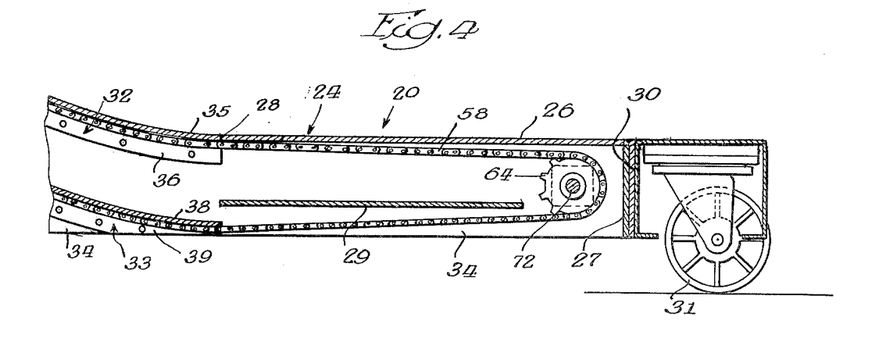
Figure 4 is an enlarged vertical longitudinal section of the front portion of the base frame of the workstand.

The base frame 20 is horizontally elongated. It is H-shaped so far as contour or configuration is concerned and consists of a horizontal, longitudinally extending intermediate member 24 and a pair of horizontal, transversely extending end members 25. The intermediate member 24 comprises a flat, elongated plate 26 and a pair of end plates 27. The plate 26 extends horizontally and has in the central and rear portion thereof a longitudinally extending cutout 28. The end plates 27 extend vertically. They are arranged transversely with respect to the plate 26 and are connected to, and depend from, the ends of said plate. In addition to the plate 26 and the end plates 27 the intermediate member 24 of the base frame 20 comprises an elongated, horizontally extending plate 29. The latter is disposed in parallel relation with the plate 26 and is spaced beneath the front end portion of the latter. The end members 26 of the base frame are channel shaped in cross section and consist of horizontally extending intermediate webs and depending inner and outer side flanges. The central portions of the inner side flanges of the end members 25 are provided with fixed plates 30 and these are welded or otherwise fixedly secured to the end plates 27 of the intermediate member 24 of the base frame. Preferably the end members 25 of the base frame are positioned so that the intermediate webs thereof lie in the same plane as, and form continuations of, the plate 26 of the intermediate member 24. Swivel type casters 31 are connected to and depend from the ends of the intermediate webs of the end members and serve to impart portability to the workstand as a whole to the end that the latter may be readily moved from place to place. The ends of the inner and outer side flanges of the end members 26 are cut away as shown in Figure 2 in order to permit the casters to swivel throughout 360°.

Figures 7, 8, 9:
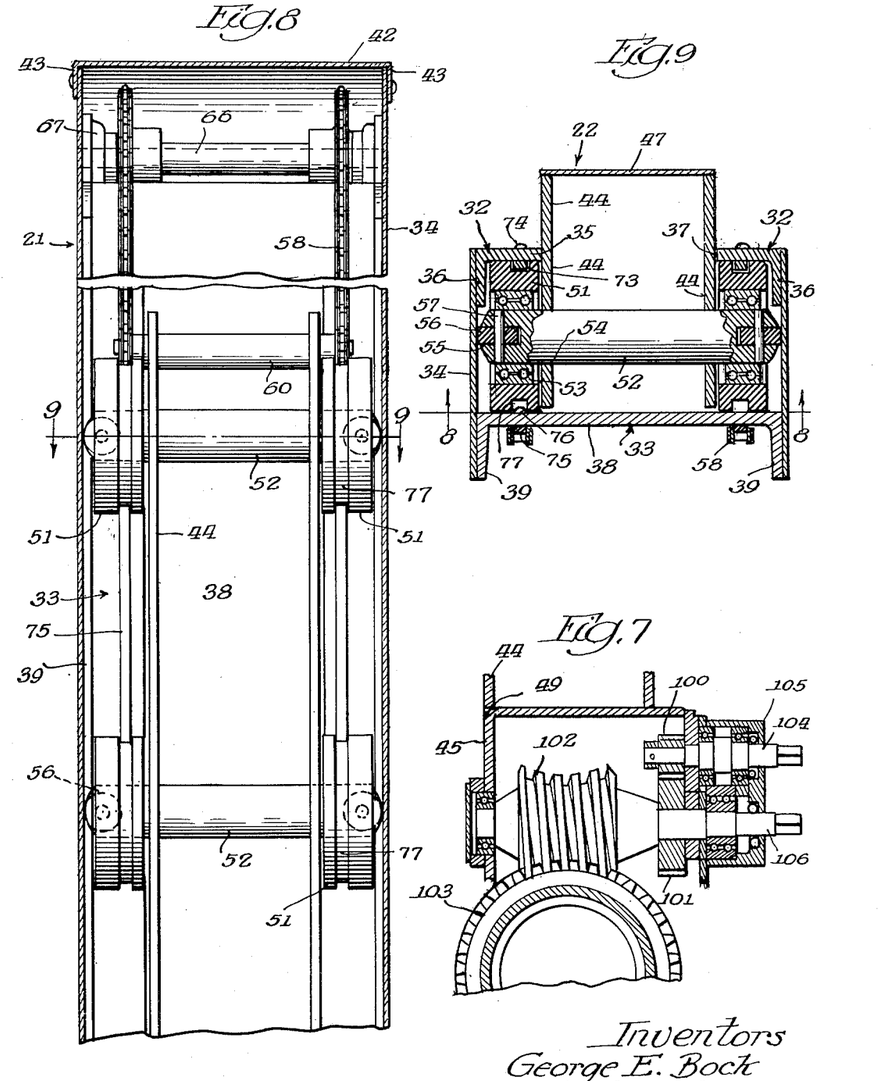
Figure 7 is a vertical transverse section taken on the line 7—7 of Figure 5 and showing in detail the construction and design of the gearing for turning or rotating the tubular rotary holder member on the carriage.
Figure 8 is a transverse section of the upper end of the arcuate track.
Figure 9 is a horizontal section taken on the line 9—9 of Figure 8 and illustrating in detail the design and construction of the track.
Figures 10, 11:
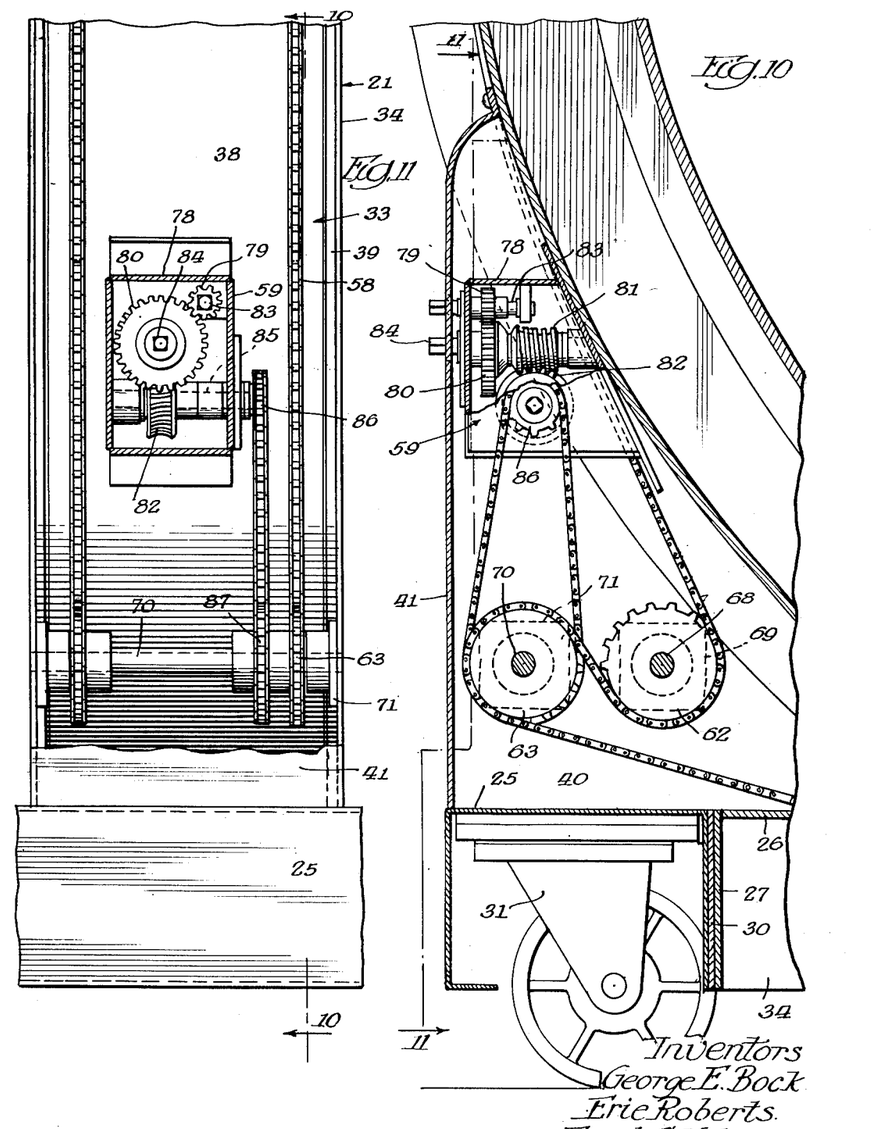
Figure 10 is a vertical longitudinal section of the lower rear portion of the workstand, illustrating in detail the construction and design of the gearing for propelling the carriage back and forth along the arcuate track.
Figure 11 is a vertical transverse section on the line 11—11 of Figure 10.

The arcuate track 21 is fixedly connected to, and extends upwards from, the caster equipped base frame 20. It is both rigid and hollow and consists of a pair of arcuate, laterally spaced angle bars 32, an arcuate channel beam 33 and a pair of side plates 34. The angle bars and the channel beam extend throughout an arc of approximately 135° and are supported in concentric and spaced apart relation by the side plates 34. As shown in Figure 9, the angle bars 32 are disposed inwards of the channel beam 33 and consist of circumferential flanges 35 and radially extending flanges 36. The circumferential flanges 35 extend towards one another and define therebetween an arcuate space 37 which leads to the interior of the track 21. The radially extending flanges 36 of the angle bars 32 are joined to, and project outwards from, the outer margins of the circumferential flanges 35. The arcuate channel beam 33 consists of a circumferential web 38 and a pair of radially extending side flanges 39. The side flanges are joined to, and project outwards from, the side margins of the web 38 and lie in the same planes as the radially extending flanges 38 of the arcuate angle bars 32. The side plates 34 of the track extend between the angle bars and the channel beam and fit flatly against, and are welded to, the radially extending flanges 36 of the angle bars and the side flanges of the channel beam. The lower ends of the circumferential flanges 35 of the angle bars 32 abut against, and are welded to, the portion of the elongated plate 26 that defines the inner end of the cutout 28. The lower end of the channel beam 38 terminates adjacent said inner end of the cutout. The intermediate parts of the side plates 34 of the track extend downwards through the side portions of the cutout 28 and are welded to the portions of the plate 26 that define said side portions of the cutout. The lower end parts of the side plates 34 underlie and are welded to the front end portions of the side margins of the plate 26 and abut against, and are welded to, the central portion of the inner side flange of the front end member 25 of the base frame 20. The elongated horizontally extending plate 29 of the base frame extends between, and is welded to, the lower marginal portions of the lower end parts of the side plates 34. The intermediate parts of said side plates are extended rearwards and downwards to provide a pair of side panels 40 which overlie, and are welded to, the central portion of the rear end member 25 of the base frame. The vertical margins of these side panels are cross-connected by a vertically extending plate 41. The lower rear corners of the side panels 40 have cutouts to accommodate the central portion of the rear end member 25. The upper end of the arcuate track 21 is closed by way of an inverted U-shaped cover plate 42 and this has inwardly extending side flanges 43 which are welded to the upper ends of the side plates 34 of the arcuate track.

Figure 1:
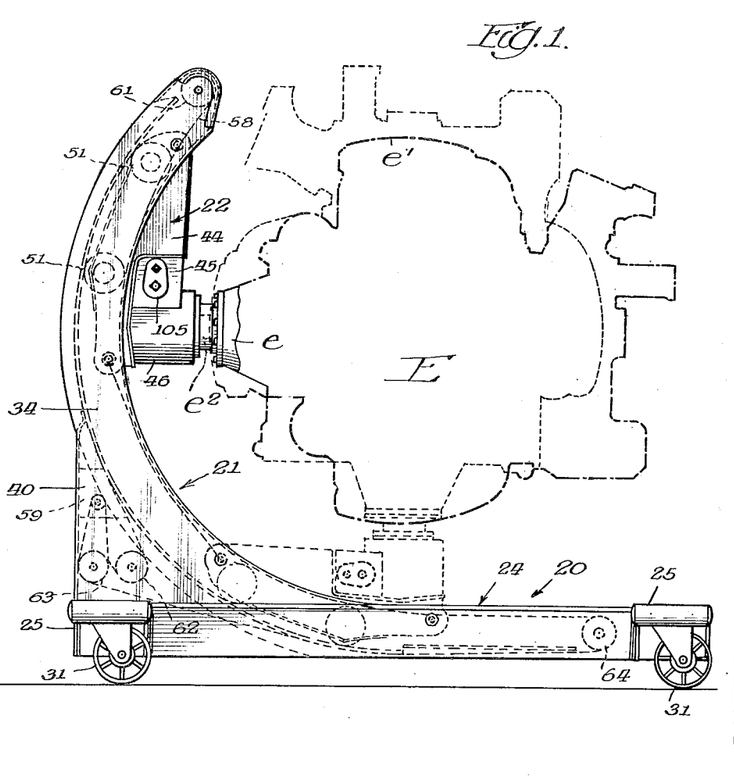
Figure 1 is a side elevation showing an adjustable workstand embodying the invention, the carriage of the workstand being shown at the upper end of the upstanding arcuate track, and supporting a radial type aircraft engine in such manner that the crank shaft extends horizontally and the cylinders lie in substantially a vertical plane.
Figures 5, 6:
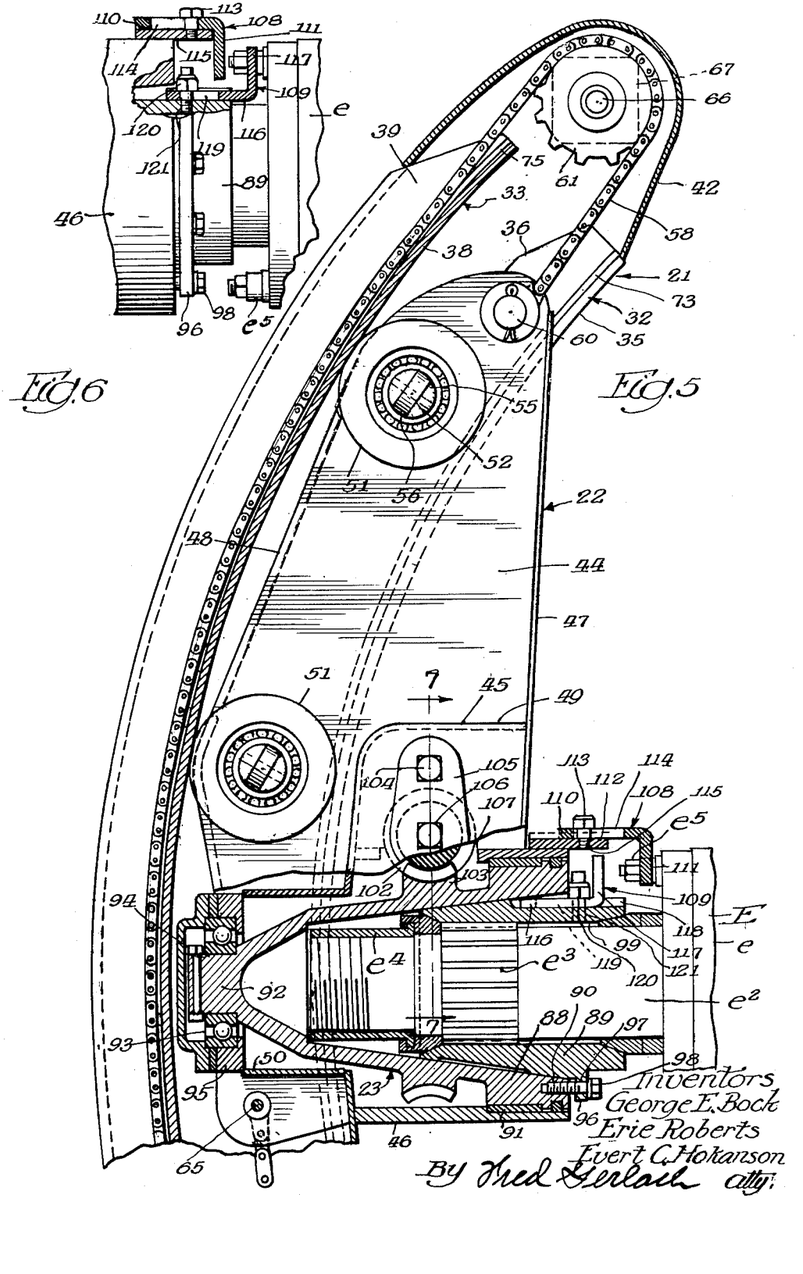
Figure 5 is an enlarged vertical section of the carriage and the upper end of the arcuate track.
Figure 6 is a fragmentary side elevation of the tubular rotary holder member on the carriage, showing the latch device that is movably mounted on the holder in its latched or operative position wherein it serves to lock the crank case of the engine against rotation with respect to the holder to the end that the holder operates to effect turning of the entire engine.

The carriage 22 is disposed partly within, and partly exteriorly of, the upstanding arcuate track 21 and is adapted to travel lengthwise along the track. It is of unitary design or construction and comprises a pair of parallel, laterally spaced side plates 44, a housing 45 and a sleeve-like part 46. The side plates are elongated lengthwise of the track and extend transversely through the arcuate space 37 which, as previously pointed out, is between the circumferential flanges 35 of the angle bars 32 of the track. For convenience the carriage will be described while positioned at the upper end of the track as shown in Figure 5 of the drawings. The side plates 44 are held in rigid, spaced apart relation by the housing 45 and a pair of crossplates 47 and 48 and have in their lower exposed corners cutouts 49. The housing 45 fits within the cutouts and is welded to the side plates 44. It is shaped as best shown in Figure 5 and embodies a tubular extension 50 which is disposed between the track enclosed lower corners of the side plates 44. The crossplate 47 is disposed between, and welded to, the upper portions of the exposed side margins of the side plates and the other crossplate, i. e., the crossplate 48, extends between, and is welded to, the upper portions of the track enclosed side margins of the side plates. The sleeve-like part 46 of the carriage 22 is suitably fixedly mounted within the housing 45 and is arranged so that it extends radially with respect to the arcuate track 21. The carriage 22 is provided with four rollers 51 whereby it is mounted for ready travel in either direction along the upstanding arcuate track. These rollers are disposed within the track and extend between the circumferential flanges 35 of the angle bars 32 and the side margins of the circumferential web 38 of the arcuate channel beam 33. They are located outwards of the carriage side plates 44 as shown in Figure 9 and are arranged in pairs, there being an upper pair adjacent the upper ends of the carriage side plates 44 and a lower pair adjacent the central portions of the side plates. The four rollers 51 are rotatably mounted on the ends of a pair of axles 52 by way of conventional ball bearings 53. The axles are arranged transversely of the carriage 22 and extend through holes 54 in the side plates 44. They are welded to the portions of the side plates that define the holes 54 and are of such length that the ends thereof project substantially to the side plates 34 of the upstanding arcuate track 21. The ball bearings 53 are located directly outwards of the carriage side plates 44 and extend between the outer ends of the axles 52 and the inner peripheries or hub portions of the rollers 51. The outer ends of the axles are provided with longitudinally extending notches 55 in which are disposed small sized rollers 56. The latter are rotatably mounted on fixed crosspins 57 in the outer ends of the axles, as shown in Figure 9. They engage and travel on the central portions of the track side plates 34 and serve to hold the carriage 22 against lateral displacement with respect to the track. The carriage 22 and the arcuate track 21 are so designed or constructed that when the carriage is moved or propelled upwards to the upper end of the track the axis of the sleeve-like part 46 of the carriage is horizontal (see full line position of carriage in Figure 1). When the carriage 22 is moved or propelled downwards to the lower end of the track 21 the sleeve-like part 46 of the carriage is so positioned that the axis thereof extends vertically (see dotted line position of carriage in Figure 1). The extent of movement of the carriage is an arc of 90°, although it is to be understood that by changing the length and radius of the track 21 the extent of movement of the carriage may be increased or decreased. For practical purposes, however, it has been found that satisfactory results are obtained when the extent of movement of the carriage is a 90° arc between a position wherein the sleeve-like part 46 extends horizontally and a position wherein such part extends vertically.

The carriage 22 is moved or propelled back and forth along the upstanding arcuate track 21 by gearing in the form of a pair of side by side roller chains 58 and a gear unit 59. Certain ends of the chains 58 are suitably anchored to the ends of a crosspin 60 at the upper end of the carriage. The crosspin 60 extends through holes in, and is welded to, the upper ends of the side plates 44 of the carriage and is located directly above the upper pair of rollers 51. From the crosspin 60 the two roller chains 58 extend first upwards, then half way around a pair of laterally spaced sprocket wheels 61, then downwards along the outer face of the circumferential web 38 of the arcuate channel beam 33 of the track 21, then under and part way around a pair of idler sprocket wheels 62, then over and approximately three-quarters the way around a pair of drive sprocket wheels 63, then forwards under the flat elongated plate 26 of the intermediate member 24 of the base frame 20, then half way around a pair of sprocket wheels 64, and finally rearwards and upwards around the circumferential flanges 35 of the angle bars 32 to the track enclosed lower corners of the carriage side plates 44 where they are anchored to the ends of a crosspin 65. As best shown in Figure 5 the crosspin 65 is located directly beneath the tubular extension 50 of the housing 45 and extends through aligned holes in, and is welded to, the track enclosed lower corners of the carriage side plates 44. The sprocket wheels 61 are located directly inwards of the upper ends of the side plates 34 of the track 21 and are fixedly mounted on a horizontally extending shaft 66. The latter extends transversely of the track 21 and has its ends journalled in bearings 67 which are fixed to, and extend inwards from, the upper ends of the track side plates. The idler sprocket wheels 62 are disposed directly over the rear end member 25 of the base frame 20 and are fixedly mounted on a horizontal shaft 68, the ends of which are journalled in a pair of opposed bearings 69 on the inner faces of the side panels 40, constituting parts of the side plates 34 of the arcuate track. The driven sprocket wheels 63 are located directly rearwards of the idler sprocket wheels 62 and are fixedly secured to a horizontal shaft 70. The ends of such shaft are journalled in opposed bearings 71 which are secured to the inner faces of the side panels 40. The sprocket wheels 64 are located directly inwards of the front parts of the lower ends of the track side plates 38. They are located but a small distance rearwards of the central portion of the front end member 25 of the base frame 20 and are fixedly mounted on a horizontal shaft 72, the ends of which are journalled in suitable bearings. As best shown in Figure 9, the circumferential flanges 35 of the angle bars 32 of the track are provided with a pair of arcuate, longitudinally extending strips 73. Such strips are secured in place by rivets 74 and serve to guide and hold against lateral displacement the portions of the roller chains 58 that travel around the circumferential flanges 36 in connection with movement or propulsion of the carriage 22. The portions of the roller chains that travel around the circumferential web 38 of the arcuate channel beam 33 of the track are guided by way of a pair of arcuate strips 75. Such strips are secured to the outer or exposed surfaces of the circumferential web 38 by rivets 76 and are disposed in radial alignment with the guide strips 73 on the circumferential flanges of the channel bars 32. The main rollers 51 for the carriage 22 have in the outer peripheries thereof grooves 77 for accommodating the guide strips 73 and the rivets 76 (see Figure 9). When the drive sprocket wheels 63 are rotated in one direction they operate through the medium of the roller chains 58 to move or propel the carriage 22 upwards along the track 21. Reverse rotation of the drive sprocket wheels results in downward movement or propulsion of the carriage along the arcuate track.

The gear unit 59 constituting a part of the mechanism for propelling the carriage back and forth along the track 21 overlies the idler sprocket wheels 62 and the drive sprocket wheels 63 and for the main part is located between the upper portions of the side panels 40. It consists of a housing 78 and gearing within the housing. The housing is suitably mounted within the upper portions of the side panels 40 and embodies inner and outer walls, top and bottom walls, and side walls. The gearing constituting part of the gear unit consists of a pinion 79, a gear 80, a worm 81 and a worm wheel 82. The pinion 79 is mounted on a horizontal shaft 83 which is journalled in suitable bearings in the upper portion of the housing 78 and extends lengthwise of the base frame 20 of the workstand. The outer end of the shaft 83 is polygonal in cross section. It extends through aligned holes in the outer wall of the housing 78 and the upper end of the vertically extending plate 41 and is adapted to have a suitable crank (not shown) applied to it to the end that the shaft 83 and the pinion 79 may be turned by the crank. The gear 80 underlies and meshes with the pinion 79 and is fixedly secured to a horizontal shaft 84. The latter is disposed in parallel relation with the pinion carrying shaft 83 and is journalled in suitable bearings on the inner and outer walls of the housing 78. The outer end of the shaft 84 projects through aligned holes in the outer wall of the housing 78 and the upper end of the plate 41 and, like the outer end of the shaft 83, is polygonal in cross section. It is adapted to be turned by a crank when high speed drive of the gear unit 59 is desired. The worm 81 is keyed or otherwise fixedly secured to the central portion of the shaft 84 and meshes with, and serves to drive, the worm gear 82. The latter is fixedly mounted on a horizontal shaft 85 which extends at right angles to the shafts 83 and 84 and is journalled in suitable bearings on the side walls of the housing 78. One end of the shaft 85 extends through the adjacent side wall of the housing 78. It is operatively connected to the shaft 70 by a sprocket wheel and chain connection. The latter consists of a sprocket wheel 86 on said projecting one end of the shaft 85, a sprocket wheel 87 on the shaft 70 and an endless chain around the two sprocket wheels 86 and 87. When the gear unit 59 is driven in one direction it operates through the medium of the sprocket wheel and chain connection to drive the sprocket wheels 63 in one direction and reverse drive of the gear unit results in reverse turning or drive of said sprocket wheel 63. Low speed drive of the sprocket wheel 63 is accomplished by turning the shaft 83 with a crank and high speed drive of the gearing unit is effected by applying a crank to the outer end of the shaft 84. It is contemplated that when the workstand is in use and there is an object on the carriage 22 travel of the carriage with respect to the track will be effected by low speed drive of the gear unit 59 and when there is no load or object on the carriage propulsion of the latter will be effected by high speed drive of the gear unit. Because the gearing of the gear unit includes the worm 81 and the worm gear 82 it is irreversible and hence the carriage 22 may be moved or propelled along the track only by operating the gear unit 59.

The tubular rotary holder member 23 is of composite or two-piece character and consists of an outer part 88 and a complemental, removable inner part 89. The outer part 88 is disposed within the housing 45 and the sleeve-like part 46 of the carriage 22. The front end of the outer part 88 has an annular series of screw threaded holes 90 and is journalled in the front end of the sleeve-like part 46 by way of a bearing 91. The rear end of the outer part 88 is tapered and embodies a cylindrical extremity 92 which is journalled in a roller bearing 93. The latter embodies an inner race which is clamped on the cylindrical extension 92 by way of a nut 94 on the outer end of said extension and the outer race of the bearing fits within a bore in a rectangular block 95. Such block, as best shown in Figure 5, is located directly rearwards of the tubular extension 50 of the carriage housing 45 and extends between, and is welded to, the track enclosed lower corners of the carriage side plates 44. The inner part 89 of the tubular rotary holder member 23 is adapted to fit within the front end of the outer part 88 and has at its front end an outwardly extending substantially circular flange 96. The latter has an annular series of holes 97. These holes correspond in number to the screw threaded holes 90 and are adapted to receive the shanks of an annular series of bolts 98. The bolts are adapted to fit within the screw threaded holes 90 in the front end of the outer part 88 and serve when in place to clamp the inner part 89 of the holder member 23 in fixed relation with the outer part 88. The inner part 89 is provided with an annular series of longitudinally extending internal splines 99 for engagement or interfitting relation with the external splines $e^3$ on the exposed end of the crank shaft $e^2$ of the engine E. When it is desired to support the engine E on the workstand the inner part of the holder member 23 is first removed from the outer part 88 by removing the bolts 98. Thereafter the inner part is slid onto the exposed end of the engine crank shaft and is locked in place by way of the nut $e^4$ and the aforementioned cone type washers on the crank shaft. When the inner part of the holder member is applied to the exposed end of the engine shaft the engine, by way of any suitable hoisting apparatus, is so manipulated as to bring the inner part 89 into the outer part 88. After such manipulation on the part of engine the bolts 98 are inserted through the holes 97 in the flange 96 and are screwed into the holes 99 in the front end of the outer part 88 of the holder member. After proper insertion and tightening of the bolts 98 the holder member forms a cantilever type support for the engine and is capable of supporting the entire engine without the assistance of additional supporting means. The holder member 23, as a result of the fact that the outer part 88 thereof is journalled by way of the bearings 91 and 93, is capable of being rotated throughout an arc of 360°.

Rotation of the rotary tubular holder member 23 is effected by way of irreversible gearing disposed within the housing 45 of the carriage 22 and consisting of a pinion 100, a gear 101, a worm 102, and a worm gear 103. The pinion 100 is mounted fixedly on a horizontal shaft 104. The latter extends transversely of the carriage 22 and is journalled in suitable ball bearings in a cup shaped cover plate 105 at one side of the housing 45. One end of the shaft 104 projects outwards through the cover plate 105 and is polygonal in cross section in order that the shaft together with the pinion 100 may be turned by a crank (not shown). Preferably the shaft 104 is disposed above the rotary holder member 23. The gear 101 is disposed beneath and meshes with the pinion 100 and is fixedly secured to a horizontal shaft 106. The latter is disposed in parallel relation with the shaft 104 and has one end thereof journalled in a ball bearing in the cover plate 105. The other end of the shaft is journalled in a ball bearing on the upper portion of one of the side walls of the carriage housing 45. The first mentioned end of the shaft 106 projects through the cover plate 105 and is polygonal in cross section in order that a crank may be applied to it when it is desired to effect high speed drive of the gearing for effecting rotation of the rotary tubular holder member 23. The worm 102 is disposed in the upper portion of the housing 45 and is keyed or otherwise fixedly secured to the shaft 106. The worm gear 103 is disposed beneath and meshes with the worm 102 and surrounds, and is formed integrally with, the central portion of the outer part 88 of the holder member 23. As best shown in Figure 5, the worm 102 fits within a cutout 107 in the upper portion of the sleeve-like part 46 of the carriage. When the gearing within the housing 45 is driven in one direction the holder member 23 is turned in one direction. Reverse rotation of the gear results in reverse turning of the holder member. Low speed drive of the gearing within the housing 45 is accomplished by turning the pinion carrying shaft 104 with the aforementioned crank and high speed drive of the gear is effected by turning the gear and worm carrying shaft 106 with the crank.

In addition to the parts heretofore mentioned the workstand comprises a latch device 108 and a latch device 109. The latch device 108 is adapted to be brought into play or use when it is desired to hold the crank case and cylinders of the engine E against turning relatively to the carriage 22 while at the same time permitting the crank shaft of the engine to be turned in connection with rotation of the tubular rotary holder member 23. The other latch device, i. e., the latch device 109, is adapted to be brought into play or use when it is desired to lock the crank case of the engine to the holder member in order that turning or rotation of such member results in turning or rotation of the entire engine. It is contemplated that the two latch devices will be used selectively when the workstand is used as a supporting medium for the engine E.

The latch device 108 is L-shaped and consists of a horizontal piece 110 and a vertical piece 111. It is slidable forwards into a latched position and rearwards into an unlatched position and is supported by a horizontal plate 112. The latter is connected to, and projects forwards from, the upper portion of the front end of the sleeve-like part 46 of the carriage. The horizontal piece 110 of the latch device 108 rests on the plate 112 and is slidably connected to the latter by way of a vertical bolt 113. The shank of the bolt extends through a longitudinal slot 114 in the horizontal piece 110 of the latch device 108 and into a screw threaded hole 115 in the outer portion of the plate 114. When the bolt 113 is loosened the latch device 108 may be shifted into and out of its latched position. The latch device is locked in either its latched position or its unlatched position by tightening the bolt 113. The vertical piece 111 of the latch device 108 is connected to, and depends from, the outer portion of the horizontal piece 110 and is adapted when the latch device is shifted forwards into its latched position to fit between and interlock with two adjacent bolts of the annular series of equidistantly spaced bolts $e^5$ on the crank case $e$ of the engine E. When the latch device 108 is locked in its latched position wherein the vertical piece 112 is in interlocked relation with two adjacent bolts $e^5$ the device locks the crank case and cylinders of the engine against turning relatively to the carriage while at the same time permitting the crank shaft of the engine to be turned in response to rotation of the holder member 23 by the gearing within the carriage housing 45. When it is desired to release the crank case of the engine so that the entire engine may be turned or rotated to any desired angular extent the bolt 113 is loosened and the latch device 108 is slid rearwards into its unlatched position wherein the vertical piece 112 is disengaged from the crank case bolts $e^5$.

The latch device 109 for locking the crank case $e$ of the engine E to the holder member 23 to the end that rotation of the holder member by the gearing within the carriage housing 45 effects corresponding turning of the entire engine is of L-shaped configuration and consists of a horizontal piece 116 and a vertical piece 117. It is mounted so that it is slidable forwards into a latched position wherein it is in interfitting relation with two of the crank case bolts $e^5$ and rearwards into an unlatched position wherein it is free of the crank case bolts, and functions in the same manner as the latch device 108. The horizontal piece 116 of the latch device 109 is mounted for forward and rearward sliding movement in an external longitudinally extending groove 118 in the front end of the inner part 89 of the tubular rotary holder member 23. In the central portion of the horizontal piece 116 is a longitudinal slot 119 through which a bolt 120 extends transversely. Such bolt is arranged so that the head thereof is disposed adjacent the outer face of the horizontal piece 116 and the free end of its shank extends into a screw threaded hole 121 in the outer end of the inner part 89. When the bolt 120 is loosened or unscrewed the latch device 109 is released so that it may be slid into and out of its latched or operative position. The latch device 109 is locked or retained in either its latched or unlatched position by tightening the bolt 120. The vertical piece 117 of the latch device 109 is connected to, and extends outwards from, the front end margin of the horizontal piece 116 and is adapted when the latch device 109 is shifted into its latched position to fit between two adjacent crank case bolts $e^5$ in the same manner as the vertical piece 111 of the latch device 108. When it is desired to lock the engine E against turning relatively to the tubular rotary holder member 23 the latch device 109 is slid forwards into its latched position. When such latch device is in its latched position the engine will remain stationary unless the holder member 23 is turned by drive or manipulation of the gearing within the carriage housing 45.

When it is desired to use the workstand in connection with the performance of work on the engine E the exposed end of the engine crank shaft is operatively connected to the rotary tubular holder member 23 as heretofore described. If it is desired to position the engine so that the cylinders thereof are disposed in a vertical plane the gearing embodying the chains 58, the various sprocket wheels and the gear unit 59 is driven so as to cause the carriage 22 to move or travel to the upper end of the upstanding arcuate track 21. When the carriage is in its uppermost position the holder member 23 extends horizontally, as heretofore mentioned, and results in the engine being maintained in a position wherein the cylinders thereof lie in a vertical plane. If it is desired to have the engine positioned so that the cylinders lie in a horizontal plane the carriage 22 is moved or propelled to the lower end of the track 21. When the carriage is at the lower end of the track (see dotted lines in Figure 1) the holder member 23 extends vertically and hence supports the engine E in such position that the cylinders extend horizontally. By positioning the carriage 22 at intermediate points along the track 21 the engine may be maintained in different angular positions. If it is desired to turn the crank shaft $e^2$ of the engine while the engine is supported or mounted on the workstand the latch device 108 is first shifted into its latched position so as to lock the crank case and cylinders of the engine against rotation relatively to the carriage. Thereafter the gearing within the carriage housing 45 is driven so as to effect turning of the holder member 23 and corresponding turning of the engine crank shaft. If it is desired to rotate the entire engine relatively to the carriage the latch device 108 is shifted into its unlatched position and the latch device 109 is shifted into its latched or operative position. When the latch device 109 is in such position drive of the gearing within the carriage housing 45 results in rotation of the holder member 23 and corresponding rotation or turning of the entire engine E.

The herein described workstand provides maximum angular adjustment of the object that is supported thereon. It also provides exceptional accessibility to the object and occupies but a comparatively small space. Due to its construction and design the workstand effectively and efficiently fulfills its intended purpose and is capable of being produced or fabricated at a reasonable cost.

Whereas the workstand has been described as a medium for adjustably supporting a radial variety aircraft engine it is to be particularly understood that it has other capabilities of use insofar as it may be used to support various other objects during the performance of work thereon. It is also to be understood that the invention is not to be restricted to the precise details set forth since these may be modified within the scope of the appended claims without departing from the spirit and scope of the invention.

Having thus described the invention what we claim as new and desire to secure by Letters Patent is:

1. A workstand adapted adjustably to support an object for purposes of work thereon and comprising a portable base frame, a single elongated, rigid track connected to, and projecting upwards from, the base frame and curved so as to extend through a substantially 90° arc in a vertical plane, a carriage mounted on the track so that it is capable of being moved in either direction therealong and provided with a part extending inwards of said track, gearing for moving the carriage into any desired position along the track, an elongated object holding member mounted on said part of the carriage so that it is rotatable about an axis extending radially with respect to the track, and worm variety gearing on the carriage for rotating the member, said track being so positioned with respect to the base frame that when the carriage is at the lower end of the track the member extends vertically and when the carriage is at the upper end of the track said member extends horizontally.

2. As a new article of manufacture, a workstand adapted to support an engine of the type that comprises a sectional case with an annular series of spaced apart bolts at one end thereof, and a shaft with one end thereof extending outwards through said one end of the case and in centered relation with the series of bolts, and comprising a supporting structure, a carriage mounted on the structure so that it is movable bodily into different positions, a tubular member mounted rotatably on the carriage, adapted to receive the projecting end of the shaft and support the engine, and having means associated therewith for fixedly connecting said exposed end of the shaft to it, gearing on the carriage for rotating the tubular member, and a pair of selectively usable latch devices, one of said latch devices being mounted movably on the tubular member so that it is shiftable into and out of a latched position wherein it is in interfitting relation with certain of the bolts and serves to lock the engine case to the tubular member so that it together with the shaft is adapted to rotate therewith, the other of said latch devices being mounted movably on the carriage so that it is shiftable into and out of a latched position wherein it is in interfitting relation with certain of said bolts and serves to lock the engine case against rotation relatively to the carriage.

3. A workstand adapted adjustably to support an object during the performance of work thereon and comprising a base frame, a single elongated rigid track connected to, and projecting upwards from the base frame and curved so as to extend through a substantially 90° arc in a vertical plane, a carriage mounted on the track to move in either direction therealong, gearing adapted to move the carriage to any desired point along the track and embodying sprockets at the ends of the track and a chain extending lengthwise of the track and around the sprockets and having its ends connected to the carriage, an elongated object holding member mounted on the carriage so that it extends inwards of the track and is rotatable about an axis extending radially with respect to said track, and worm variety gearing operative when driven to rotate the member, mounted for the most part on the carriage, and including a worm wheel extending around, and connected fixedly to, said member, said track being so positioned with respect to the base frame that when the carriage is at the lower end of the track the member extends vertically and when the carriage is at the upper end of the track said member extends horizontally.

4. A workstand adapted adjustably to support an engine having a shaft with an exposed end, and comprising a base frame, a single elongated, hollow, rigid track of box-like cross section, connected fixedly to, and projecting upwards from, the base frame, curved so as to extend through a substantially 90° arc in a vertical plane, and having a longitudinal, substantially full length opening in its innermost side wall, a carriage adapted to travel in either direction along the track and embodying a roller equipped cart confined wholly within the track and a housing-like part extending through said opening and disposed for the most part exteriorly of said track, gearing adapted to move the carriage into any desired position along the track and embodying sprockets in the ends of the track and a chain extending lengthwise within the track and around the sprockets and connected to the carriage, a tubular member mounted within the housing-like part of the carriage to rotate about an axis extending radially with respect to the track, and adapted to receive the exposed end of the shaft and support the engine, and worm variety gearing within said housing-like part for rotating the member, said track being so positioned with respect to the base frame that when the carriage is at the lower end of the track the tubular member extends vertically and when the carriage is at the upper end of the track said member extends horizontally.

GEORGE E. BOCK.
ERIE ROBERTS.
EVERT C. HOKANSON.

REFERENCES CITED

The following references are of record in the file of this patent:

UNITED STATES PATENTS

| Number | Name | Date |
|---|---|---|
| 1,216,552 | Dodge | Feb. 20, 1917 |
| 1,225,651 | Krouse | May 8, 1917 |
| 1,331,938 | McConnell et al. | Feb. 24, 1920 |
| 1,345,992 | Burofsky | July 6, 1920 |
| 1,414,970 | Nelson | May 2, 1922 |
| 1,460,397 | Radke | Sept. 18, 1923 |
| 1,690,660 | Adkins | Nov. 6, 1928 |
| 2,251,731 | Daniels | Aug. 5, 1941 |
| 2,287,469 | Cochran | June 23, 1942 |
| 2,329,613 | Hokanson | Sept. 14, 1943 |
| 2,432,487 | Paxman | Dec. 9, 1947 |

FOREIGN PATENTS

| Number | Country | Date |
|---|---|---|
| 707,112 | Germany | June 13, 1941 |